(12) United States Patent
Gubler

(10) Patent No.: US 6,308,681 B1
(45) Date of Patent: Oct. 30, 2001

(54) VALVE-ARRANGEMENT FOR CONTROLLING GAS IN A PISTON-TYPE INTERNAL-COMBUSTION ENGINE

(76) Inventor: Hector A. Gubler, Azopardo 220, 5850 Rio Tercero, Cordoba (AR)

( * ) Notice: Subject to any disclaimer, the term of this patent is extended or adjusted under 35 U.S.C. 154(b) by 0 days.

(21) Appl. No.: 09/474,610

(22) Filed: Dec. 29, 1999

(51) Int. Cl.[7] .................................................... F02B 19/02
(52) U.S. Cl. .......................................... 123/292; 123/306
(58) Field of Search ..................................... 123/292, 256, 123/286, 289, 306

(56) References Cited

U.S. PATENT DOCUMENTS

| 1,302,653 | * | 5/1919 | Goodspeed | 123/256 |
| 4,404,938 | * | 9/1983 | Nikolic | 123/256 |
| 5,398,653 | * | 3/1995 | Merritt | 123/292 |
| 5,839,400 | | 11/1998 | Vattaneo et al. | 123/90.16 |
| 5,850,811 | | 12/1998 | Tomisawa et al. | 123/90.15 |
| 5,860,397 | | 1/1999 | Schafer | 123/90.17 |
| 5,865,150 | | 2/1999 | Kramer et al. | 123/90.17 |
| 5,901,550 | | 5/1999 | Bussing et al. | 123/90.15 |
| 5,915,358 | | 6/1999 | Muller | 123/90.16 |

OTHER PUBLICATIONS

Article from Reader's Digest, entitled Complete Car Care Manual. pp. 32–42.
Article from Manual and Motor Guide, Editors Negri S.R.L., entitled Technical Specification and Parts of National Imported Automobiles, pp. 1–5 (with translations).

* cited by examiner

Primary Examiner—Henry C. Yuen
Assistant Examiner—Mahmoud Gimie
(74) Attorney, Agent, or Firm—Bachman & LaPointe, P.C.

(57) ABSTRACT

A valve arrangement for controlling gas exchange in a piston-type internal-combustion engine consisting of an arrangement of valves through which it is possible to optimize the filling of the combustion chamber of the cylinder with the fuel mixture as well as exhaust of the residual gases of combustion. The system includes (provides for) the transfer of the functions of the conventional intake and exhaust valves to additional valves located in the respective intake and exhaust conduits, each of the conduits being open to and communicated with the other in the cylinder head thereby creating a common chamber or chambers (plenum or plenums) through which the respective gas mixtures are directed, permitting a partial, controlled contact between the two gas mixtures, and using the conventional valve system opening directly to the combustion chamber for enhancing the speed and efficiency of charging the combustion chamber with working fluid, sealing the combustion chamber during the processes of compression of the combustible gas mixture and expansion of residual gases of combustion, and increasing the speed and efficiency of expulsion of gases of combustion from said combustion chamber.

9 Claims, 11 Drawing Sheets

VALVE-ARRANGEMENT FOR CONTROLLING GAS IN A PISTON-TYPE INTERNAL-COMBUSTION ENGINE

BACKGROUND OF THE INVENTION

This invention relates to an arrangement of valves for an internal combustion engine and more particularly to an improved arrangement of valves that permits better engine performance while, at the same time, affording a degree of exhaust emission control by simplifying the process of exhaust gas re-circulation (EGR). In addition, the invention provides for a simplification of systems known in the art that provide improved working fluid mixing (fuel+air) and better control of premature ignition through an automatic exhaust gas recycling (EGR) mechanism.

It is well known that a variety of modifications have been incorporated over the years for improving the performance of internal combustion engines and for controlling exhaust gas emissions, and particularly for controlling the emission of hydrocarbons, carbon monoxide and NOx in the exhaust gases. Unfortunately, many of the innovations employed to provide exhaust emission control can deteriorate the fuel economy of an engine while performance enhancement often leads to greater complexity and cost in engine manufacture and maintenance.

One way in which these objectives have been met is through the use of compound induction systems for the engine wherein low and mid-range performance operation is obtained by a single, relatively small intake passage to offer good turbulence in the combustion chamber, while high speed requirements are met by a larger effective passage so as to improve volumetric efficiency in the introduction of working fluid (the combustible gas mixture, fuel/air etc.). Normally this type of compound induction system incorporates at least two intake passages that serve each combustion chamber with a throttle valve arrangement for controlling the flow through one of the intake passages so that it will supply no charge under low and mid-range load conditions. However, the existence of this additional passage and its flow control valve can give rise to pumping losses that deteriorate the fuel economy of the engine when the control valve is closed.

For the control of contaminating gas emissions, in particular NOx compounds that are major smog producing agents, the practice of exhaust gas recycling (EGR) is often incorporated. EGR is found to reduce the combustion temperature of the working fluid in the combustion chamber, thereby reducing the formation of NOx compounds and, at the same time, helping to prevent premature ignition of the combustible mixture which produces the well-known phenomenon knows as engine "knock." Premature ignition is conventionally controlled by adjusting the characteristics of the fuel by the addition of "anti-knock" agents, which are themselves known or suspected environmental contaminants.

It is a principle object of this invention to provide a novel valve arrangement that improves engine performance by reducing the physical limitations placed on conventional valve arrangements in internal combustion engines by what is known in the art as "valve flotation," in which the rate of valve opening and closing is limited by the speed with which the valve actuating mechanisms known in the art can respond physically and thereby complete their intended function.

It is a further principal object of this invention to provide a novel valve arrangement providing for common conduits leading to the combustion chamber of the engine through one or more pre-combustion chambers or plenums in which what may be considered conventional intake and exhaust chambers are openly and directly intercommunicated to form a chamber or chambers that communicate directly with the combustion chamber. Said communication between conventional conduits for induction and exhaust processes for an engine provide improved performance results under all running conditions, while at the same time providing improved exhaust emission control. These goals are achieved while simplifying the mechanical aspects of related current technology.

It is a further object of this invention to provide an improved valve arrangement for induction and exhaust processes for an engine that permits the aforementioned results while, at the same time, eliminating or substantially reducing pumping losses under low and mid-range performance so as to improve fuel economy.

One way in which NOx emissions are controlled is through the use of exhaust gas re-circulation (EGR). Re-circulating exhaust gases into the combustion chamber under at least some running conditions reduces the temperature of combustion and thereby the formation of NOx. However, the use of EGR can give rise to poor running characteristics when large quantities of exhaust gases are re-circulated, especially at high working loads.

It is, therefore, a still further object of this invention to provide an improved system for permitting increased usage of EGR without deteriorating engine performance.

It is a further object of this invention to provide an EGR system for an engine having a compound induction system wherein the EGR is employed to reduce pumping losses as well as controlling the emission of NOx.

SUMMARY OF THE INVENTION

The present invention relates to an arrangement of valves for single or multi-cylinder, piston-driven internal combustion engines, of the type comprising: a cylinder head comprised of at least one intake conduit and at least one exhaust conduit mutually communicated one with the other thereby forming one or more pre-combustion chambers or plenums, said plenum or plenums being communicated with the combustion chamber by one or more intake and exhaust valves, said valve or valves being of the conventional poppet-type with the respective valve actuation mechanisms well known in the art. The induction of working fluid into said plenum or plenums is controlled by: (a) one or more valves of the poppet type with the appropriate operating mechanisms well known in the art; (b) one or more rotary valves with the appropriate valve control mechanisms; or (c) an electronically controlled working fluid (fuel/air) mixture injection system or other suitable method for the controlled introduction of the required combustible gas mixture (working fluid) into one or more of said plenum or plenums. Said plenum or plenums being communicated with the combustion chamber of said cylinder by at least one intake valve and at least one exhaust valve for each cylinder, said valve or valves being of the conventional poppet-type with the respective valve actuation mechanisms suitable for simultaneously biasing all of said valves in the open position during both the intake and exhaust cycles of said engine.

Internal combustion engines of various configurations have been developed and used for many years with many modifications intended to optimize the performance of the engine under all running condition. In such engines, various approaches have been proposed to overcome problems with engine performance, fuel combustion efficiency, and exhaust emissions. However, the solutions proposed heretofore are not fully satisfactory from the standpoint of simplicity and reliability of construction, and sometimes have caused problems due to poor combustion at high or low operating speeds and/or unacceptably high levels of nitrogen oxides in the exhaust gases under some operating conditions.

In the current state of the art of piston-driven internal combustion four-cycle engines, several problems and limitations are encountered related to the cylinder head and the system or systems of valves employed to control the intake of the combustible fuel mixture (the working fluid) and the exhaust of residual gases of combustion. Among those disadvantages one can point out the following:

a. Since the intake and exhaust ports and their respective valves are separate and isolated one from the other, except with respect to the combustion chamber, each function (intake and exhaust) utilizes only a fraction of the surface area or communication area available in the cylinder head leading to the combustion chamber for the entrance and exit of gases. That is, only approximately fifty per cent (50%) of the theoretically available opening into the combustion chamber is available for each of the intake and exhaust processes, thereby significantly limiting the efficiency of gas exchange (working fluid and exhaust gases). In many conventional engines the intake valve is larger than the exhaust valve because the gas flow into the cylinder, usually at or near atmospheric pressure, except where supercharging is involved, is slower than the exhaust flow out of the cylinder, which occurs under the pressure of the ascending piston in the exhaust cycle. In the current invention, since the intake and exhaust ports are communicated by one or more common pre-combustion chambers (plenums), each cycle of intake and exhaust takes full advantage of all valves opening to the combustion chamber, thereby making use of 100% of the theoretically available gas passage area and significantly improving both processes in terms of the rate of cylinder charging and evacuation that can be attained. By taking advantage of the opening produced by using the conventional exhaust valves during the intake cycle, it becomes possible to simplify the valve configuration by using all valves of the same size without sacrificing efficiency in the rate of fuel mixture aspiration or exhaust. It will be clear to one experienced in the art that such an arrangement should also significantly simplify the mechanism employed for the movement of said valves since all will be functioning in the same manner simultaneously.

The use of a common pre-combustion plenum or plenums for both the intake and exhaust cycles gives the added advantages of allowing for the preheating (vaporization) of the working fluid by the residual heat of the exhaust gases remaining in the pre-combustion plenum or plenums and a more thorough mixing of said working fluid due to turbulence produced by said mixing and that produced by the influx of working fluid into the combustion chamber through the various ports provided by the conventional intake and exhaust valves.

b. In the conventional four-cycle piston-driven internal combustion engine, a certain percentage of the energy provided by the combustion process is used (lost) as the motive force necessary for operating the essential mechanical functions of the engine, such as the opening and closing of valves. In the present invention, the ability of the system to aspirate (intake) the combustible fuel mixture (working fluid) and evacuate (exhaust) the residual gas mixture through an area much greater than that of a conventional engine, reduces engine power loss in the two processes significantly because the greater area available for gas passage into and out of the combustion chamber reduces resistance to flow due to gas viscosity.

c. In a typical high technology, internal combustion engine in current production (for example, as used in the Fiat Tempra), the corresponding manual and automotive guide (February, 1994) states that during the intake cycle, the intake valves close 42° in crank shaft rotation after the piston has passed the point of bottom-dead-center, being already in the ascending compression cycle, indicating that the intake valves are still open during the initiation of the compression cycle and full theoretical compression is not obtained. Likewise, as the exhaust cycle is beginning, the exhaust valves open 47° before the piston reaches bottom-dead-center. That is, the expanding gases of combustion begin to escape before the expansion cycle is completed and useful potential work is lost. The sum of these two "overlaps" in the intake and exhaust cycles is 89° of rotation of the crank shaft, directly translated in the movement of the piston in order to obtain the optimum equilibrium result in each of the cycles. Given the greatly enhanced rate of intake and exhaust provided by the current invention in terms of the filing and evacuating of the combustion chamber, a large part or all those 89° of rotation of the crank shaft can be translated into useful, productive movement of the piston while still obtaining the optimum equilibrium in each cycle.

d. The conventional piston-driven internal combustion engine is physically limited in the number of revolutions per minute that can be obtained by, among other things, the phenomenon know as "valve flotation." Valve flotation is the condition encountered at high rpm where the physical inertia of the valves and associated mechanisms makes it impossible for the mechanical apparatus involved to alternately open and close the valves in question at a faster rate. The result is a condition in which the valves effectively appear to be "floating" between their open and closed positions. The current invention, by reducing significantly the necessity to open and close the conventional valves to the combustion chamber, all of those valves being held open during both the intake and exhaust cycles, allows the engine to obtain much higher rpm's before the effect of valve flotation becomes apparent. In other words, a given theoretical engine design can obtain much higher rpm values resulting in much improved performance characteristics.

e. In conventional high performance internal combustion engines the phenomenon known as premature ignition or engine "knock," due to high combustion chamber pressures and temperatures, necessitates the use of high octane fuels with added inhibitors (anti-knock agents), most of which are materials known or suspected to be damaging to the environment. In addition, the higher combustion temperatures obtained in high performance engines often leads to an increase in the amount of nitrogen oxides ($NO_x$) produced in the combustion process, such compounds being principle smog-producing agents. On some conventional engines, the exhaust valve is allowed to stay open at the beginning of the intake cycle so that some exhaust gases are drawn back into the cylinder (internal recycling) or recycled using some external mechanism (external recycling) where they serve to lower the combustion temperature peaks and reduce $NO_x$ formation. The current invention, by creating and unifying one or more pre-combustion chambers, allows for an automatic, self-limited mixing of residual exhaust gases with the incoming combustible mixture (working fluid), thereby accomplishing the same favorable result desired in some conventional engines without sacrificing power due to late closing of the exhaust valve during the intake cycle and without the need to add complex operating mechanisms to control the extent of EGR according to the given running conditions. An additional advantage of the current invention may be seen in a reduced need for anti-knock components in the fuel.

f. The use of overhead valves in conventional piston-driven internal combustion engines is necessitated primarily by the physical requirements of high performance engines related to the intake and exhaust cycles at high rpm and high compression ratios. The current invention, by significantly improving the speed and efficiency of each process, reduces the physical requirements leading to the necessity of using overhead valves. The replacement of overhead valve systems with simpler lateral valves could significantly reduce the cost of engine manufacture and maintenance.

g. A recent innovation in high performance engines has been the introduction of variable distribution cam shaft operation which varies automatically the timing of the opening and closing of the intake and exhaust valves according to the operating conditions of the engine, said variability in operation being accomplished by the incorporation of complex centrifugal or other mechanisms that change the spatial relationships among the respective valve cams according to the operating speed or rpm's of the engine. A further important feature of the present invention is that the same effect is obtained automatically without the need for the addition of complex valve operating mechanisms.

It is also to be pointed out that the engine according to the invention provides a better mixing of the residual gases and working fluid, so as to increase the percentage of residual gases which can be introduced into the cylinder without jeopardizing the efficiency of combustion.

BRIEF DESCRIPTION OF THE DRAWINGS

Further features and advantages of the invention will become apparent from the description which follows with reference to the annexed drawings, given purely by way of non-limiting examples, in which.

DETAILED DESCRIPTION

Figure 1:
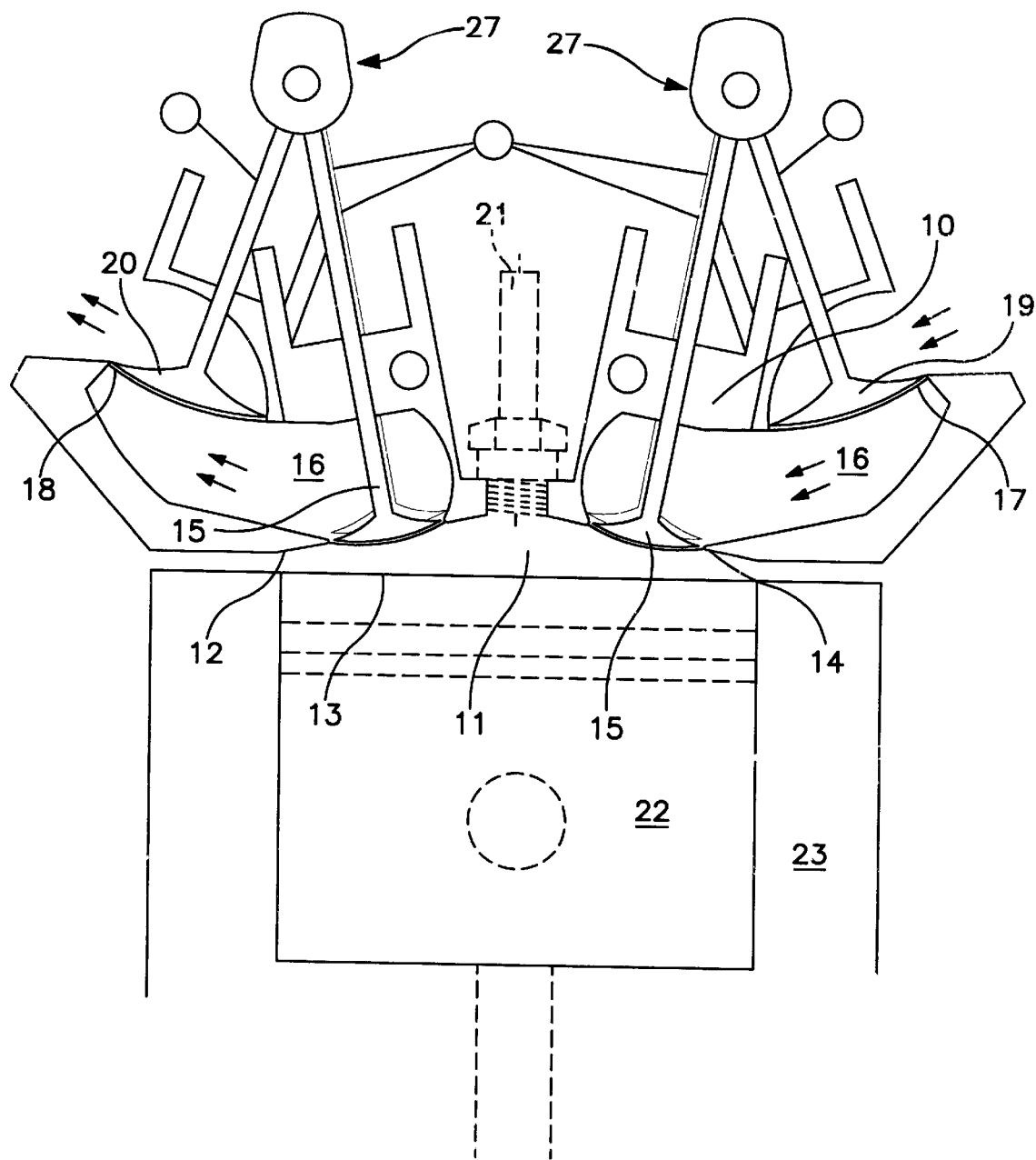
FIG. 1 is a schematic cross-sectional view of the cylinder head of an overhead-valve internal combustion engine according to the invention.

In a first preferred embodiment of the invention, an internal combustion engine is provided of the overhead valve type with one or more cylinders (only one of which is illustrated in the figures) formed in a cylinder block, said cylinder or cylinders having a piston adapted to be reciprocally moved in said cylinder, said cylinder or cylinders being sealed by attachment to the upper end of said cylinder or cylinders, and a cylinder head containing a disposition of valves according to the invention, said cylinder block and cylinder head cooperating in defining a combustion chamber.

In FIGS. 1–9 reference numeral 10 generally designates the cylinder head of a single or multi-cylinder internal combustion engine comprising, for each cylinder, a cavity 11 formed by the bottom surface 12 of the cylinder head 10, the top surface 13 of the piston, and the walls of the cylinder block 23, thus defining the combustion chamber, into which there open one or more ports or conduits 14. In a conventional overhead valve internal combustion engine known in the art, said ports or conduits would be designated as "intake" and "exhaust" ports and would be opened and closed consecutively as required for the proper functioning of the engine by the respective valve actuating mechanisms. However, for the present invention, since all of said ports or conduits are employed for both intake and exhaust operations, said ports or conduits will be defined as "gas exchange ports" and their respective valve or valves "compression valves".

The communication of said gas exchange port or ports 14 with the combustion chamber 11 is controlled by one or more compression valves 15, of the poppet-type or other type know to those skilled in the art and operated by mechanism well known in the art. Above the combustion chamber 11 and forming part of the cylinder head 10 is located one or more pre-combustion chambers or plenums 16, said plenums being communicated with one or more intake conduits 17 and one or more exhaust conduits 18. Communication of said intake conduit or conduits 17 with the pre-combustion chamber, plenum or plenums 16 is controlled by one or more intake valves 19, of the poppet-type, of the rotary-type, or of other types know to those skilled in the art. The opening and closing of said intake valve or valves 19 being controlled by mechanisms well known in the art and schematically illustrated at 27. In a preferred embodiment of the invention, cylinder or combustion chamber compression valve(s) 15, pre-combustion chamber intake valves 19, and pre-combustion chamber exhaust valve(s) 20 will be operated by a single, unified cam mechanism.

Communication of said exhaust conduit or conduits 18 with the pre-combustion chamber or chambers 16 is controlled by one or more exhaust valves 20, of the poppet-type, of the rotary-type or other type know to those skilled in the art. The opening and closing of said exhaust valve or valves 20 being controlled by mechanisms well known in the art. In a preferred embodiment of the invention, the internal combustion engine employing the valve arrangement of the invention will be of the spark ignition-type as illustrated by the presence of one or more spark plugs 21 projecting into the combustion chamber 11.

In FIG. 1, the working piston 22 is illustrated in its top-dead-center (TDC) position. In that position, the pre-combustion chamber intake valve(s) 17 and exhaust valve(s) 18 and the combustion chamber compression valves 15 are closed in preparation for the initiation of the intake cycle.

Figure 2:
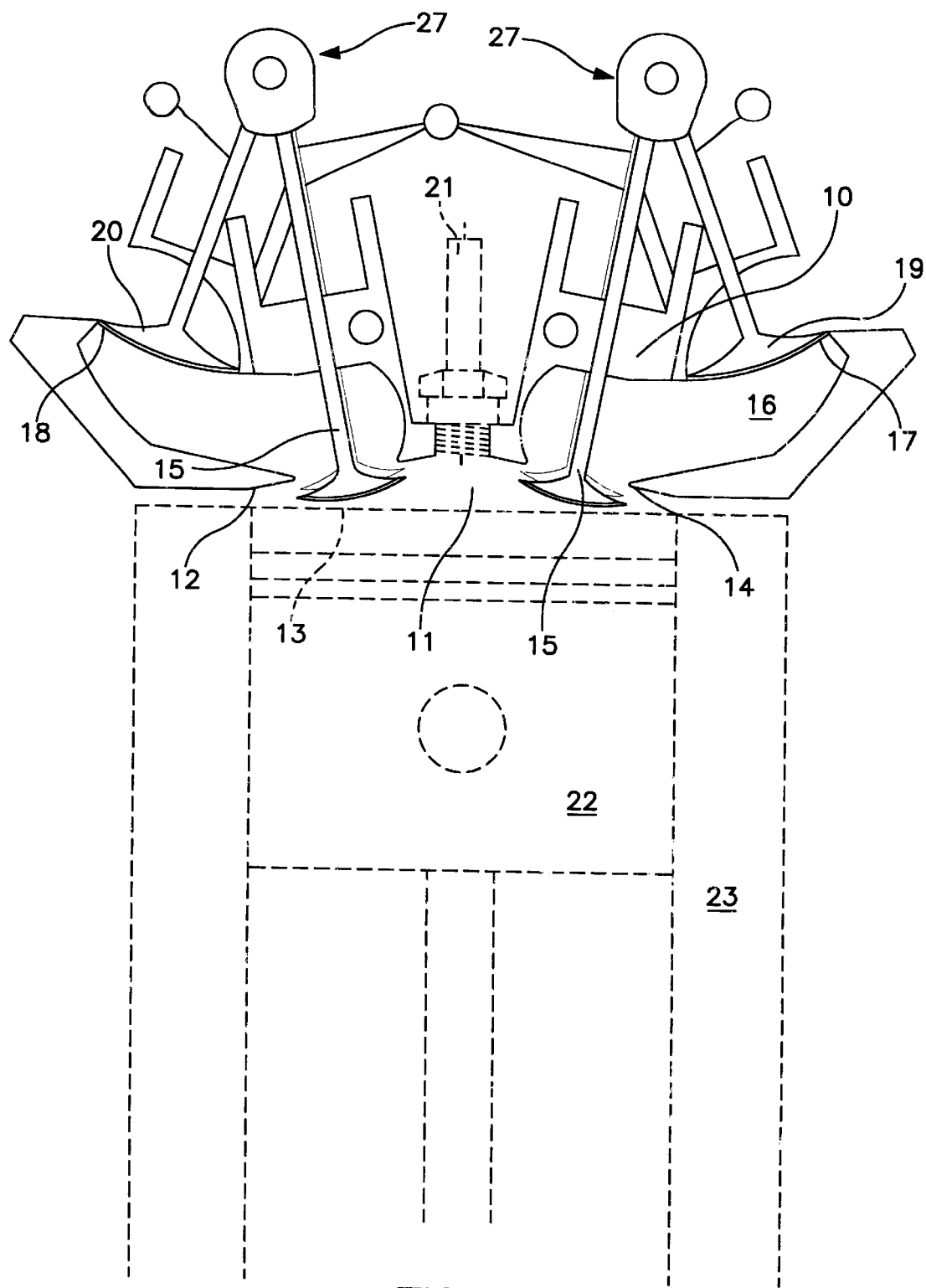
FIG. 2 is a schematic cross-sectional view of the working cylinder with the piston at top-dead-center and conventional intake/exhaust valves open in preparation for working fluid induction.

In FIG. 2, the working piston 22 has begun its downward movement to begin the aspiration or induction of working fluid (fuel/air mixture) at which time the combustion chamber compression valve or valves 15 are opened simultaneously and the pre-combustion chamber intake valve or valves 19 opens while pre-combustion chamber exhaust valve or valves 20 remains closed.

Figure 3:
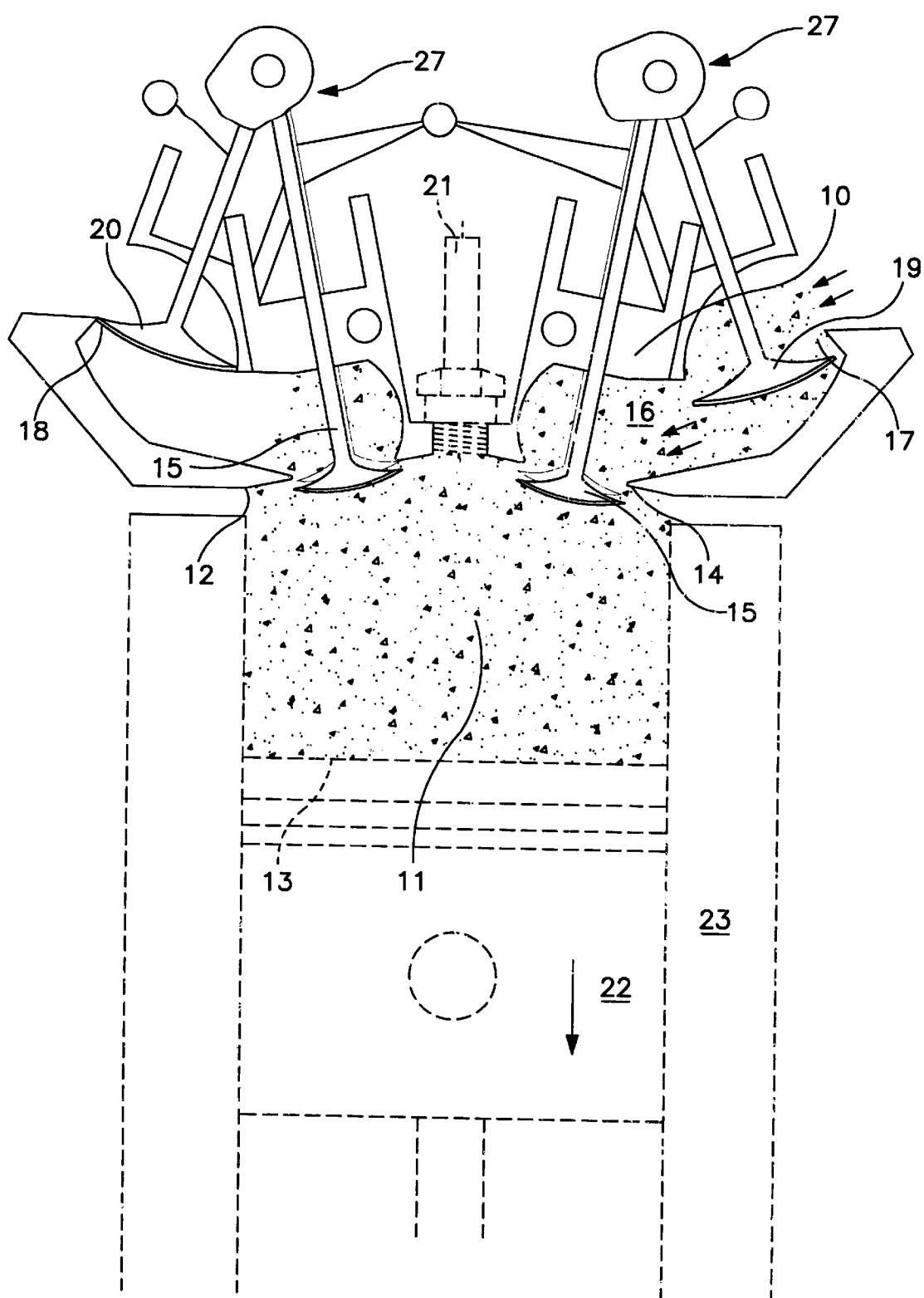
FIG. 3 is a schematic cross-sectional view of the invention during the intake cycle showing working fluid induction along with the incorporation of residual gases from the preceding exhaust cycle.
Figure 4:
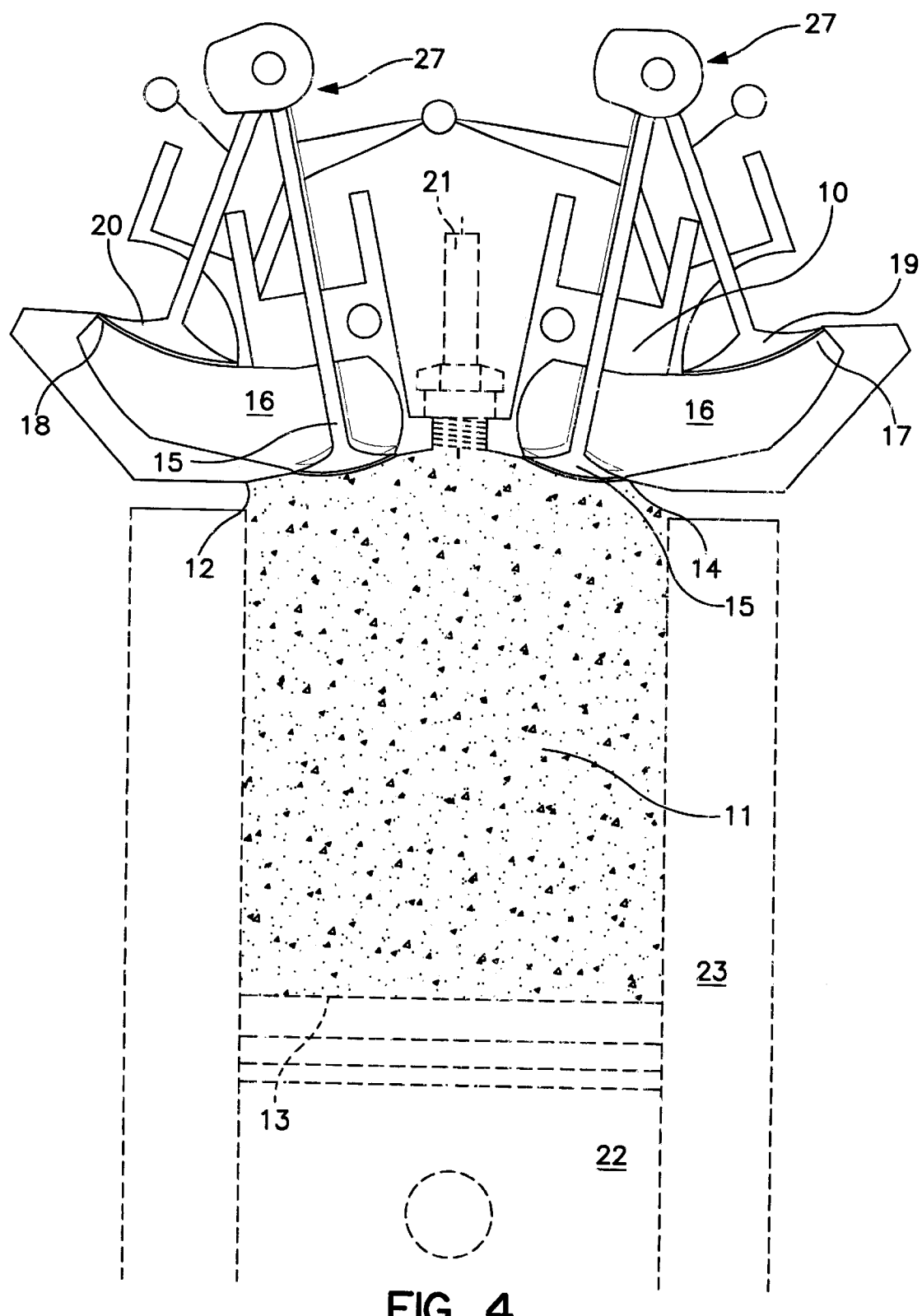
FIG. 4 is a schematic cross-sectional view of the invention with the working cylinder at bottom-dead-center in preparation for the beginning of the compression cycle.
Figure 5:
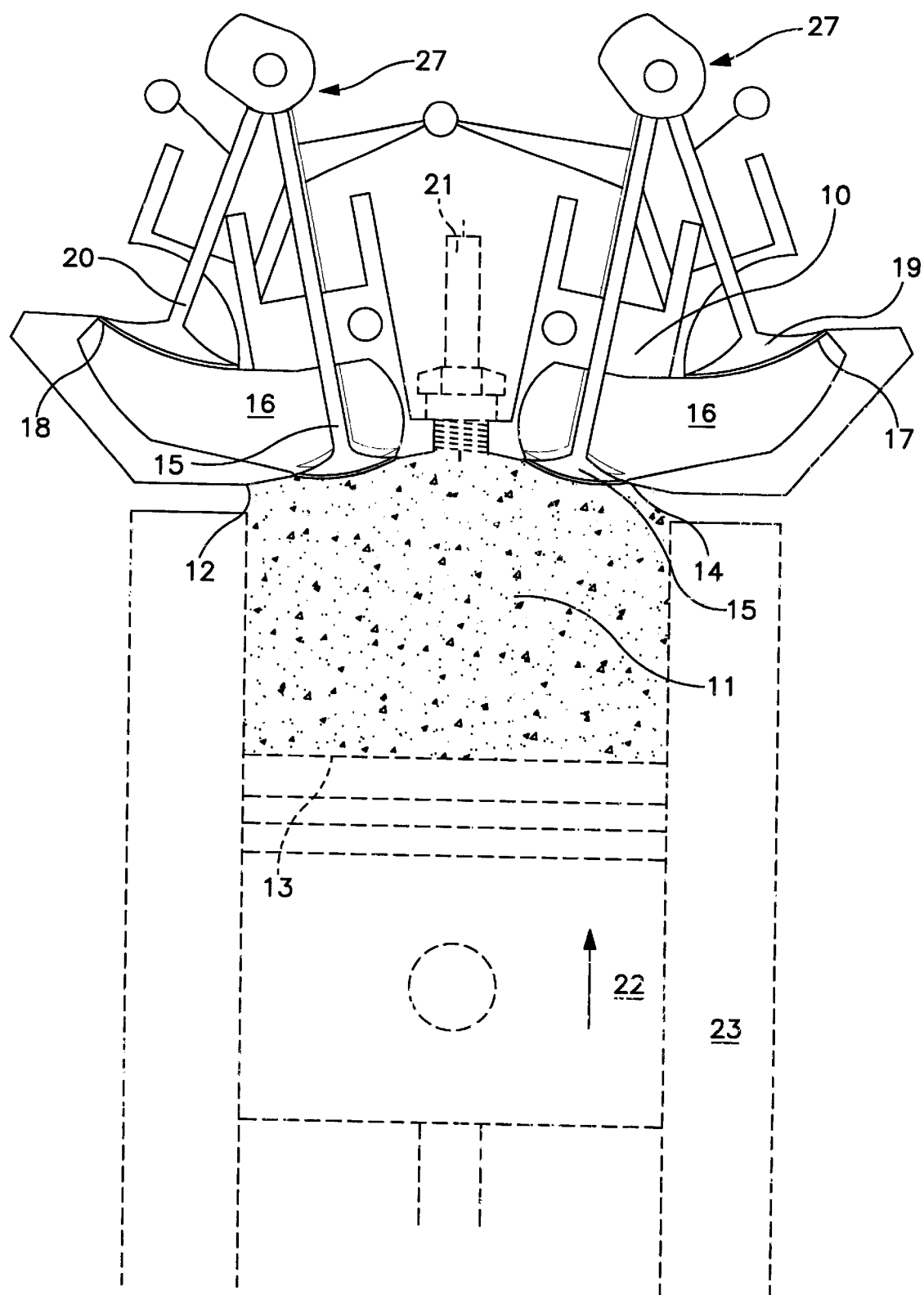
FIG. 5 is a schematic cross-sectional view of the invention showing the compression cycle with the conventional poppet-type intake and exhaust valves in their closed position.

In FIG. 3 induction of working fluid continues until the piston 22 reaches its position of bottom-dead-center (BDC) as illustrated in FIG. 4. At BDC the piston is in position to begin the compression cycle as illustrated in FIG. 5, at which time the combustion chamber compression valve or valves 15 and the pre-combustion plenum(s) intake valve or valves 19 are closed. It should be noted that the timing of the valve opening and closing cycles is not in any way limited by the invention in that some overlapping of said operations may be desirable according to the needs of the engine to insure its most efficient operation.

Figure 6:
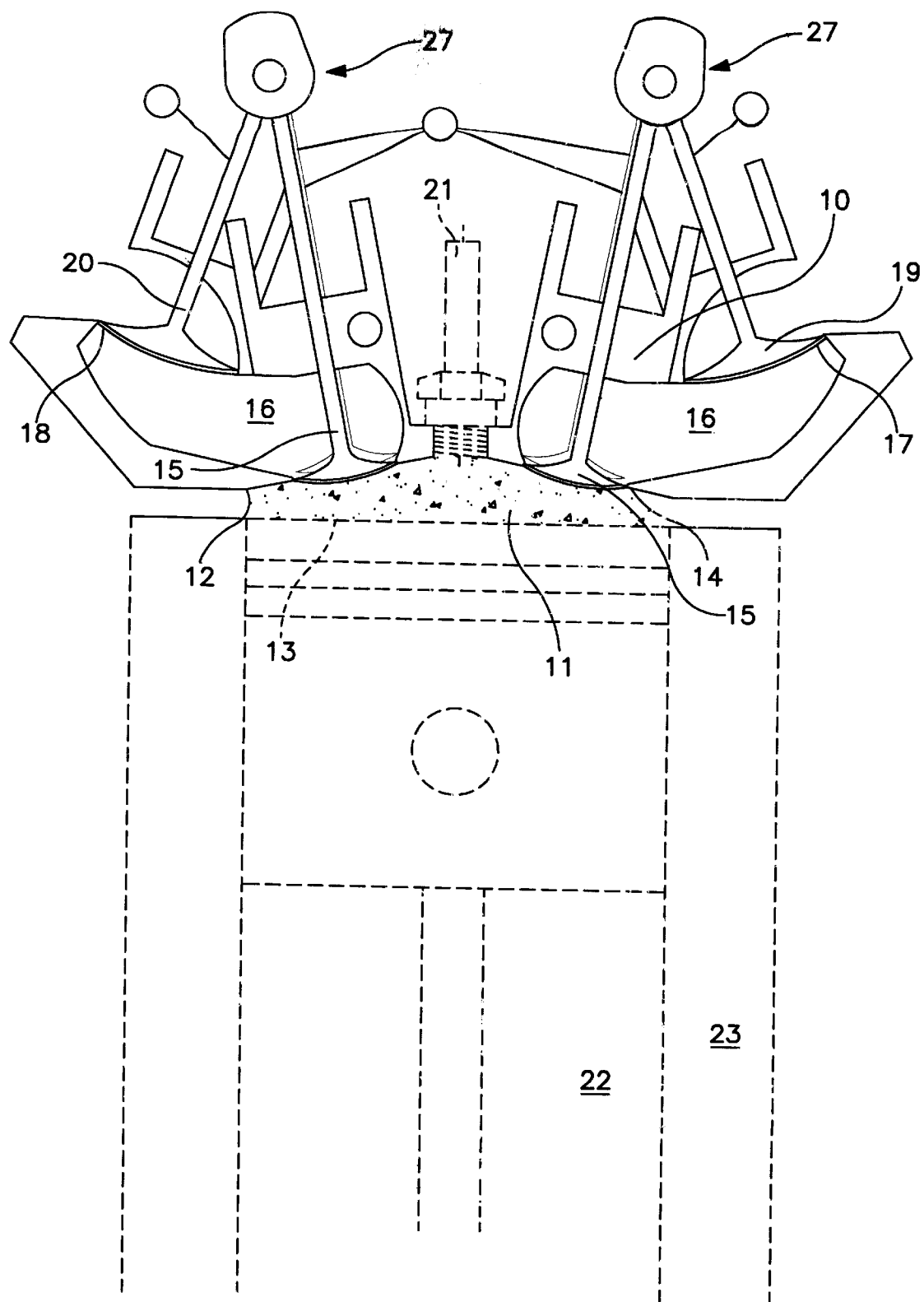
FIG. 6 is a schematic cross-sectional view of the invention at the end of the compression cycle with the working piston at top-dead-center.
Figure 7:
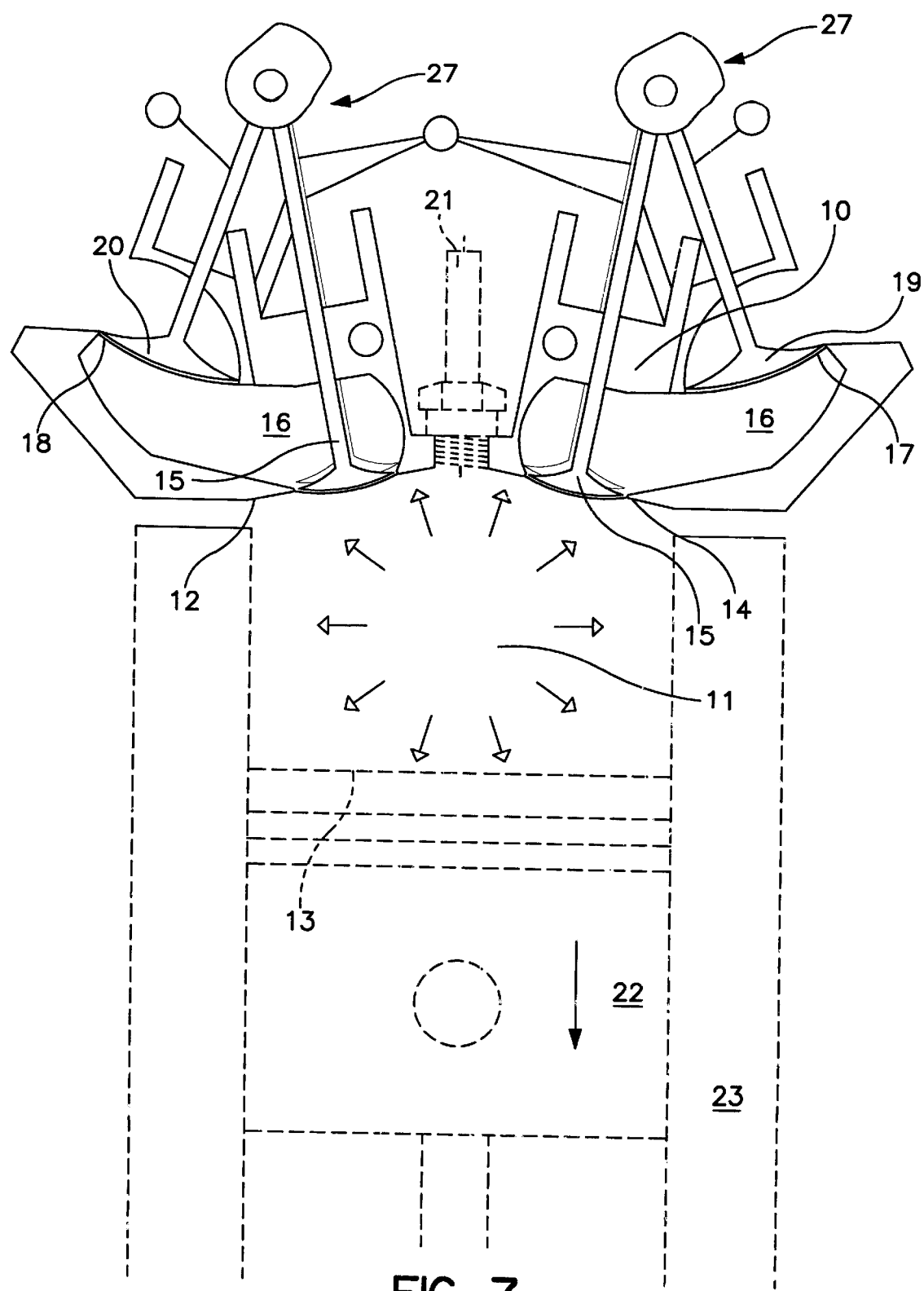
FIG. 7 is a schematic cross-sectional view of the invention after ignition of the working fluid beginning the power cycle.
Figure 8:
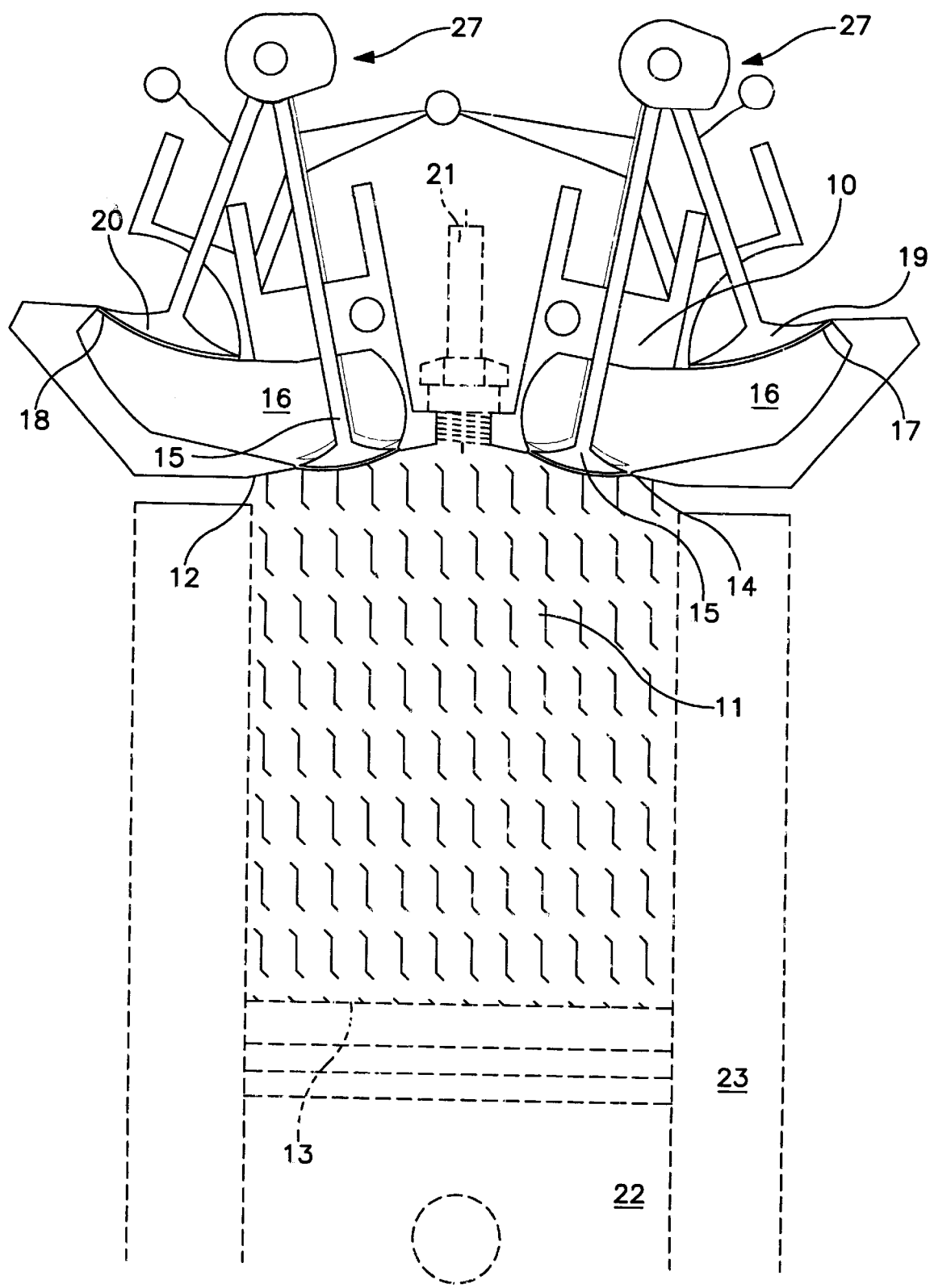
FIG. 8 is a schematic cross-sectional view of the invention after expansion of the combustion gases in the power cycle with the working piston at bottom-dead-center.
Figure 9:
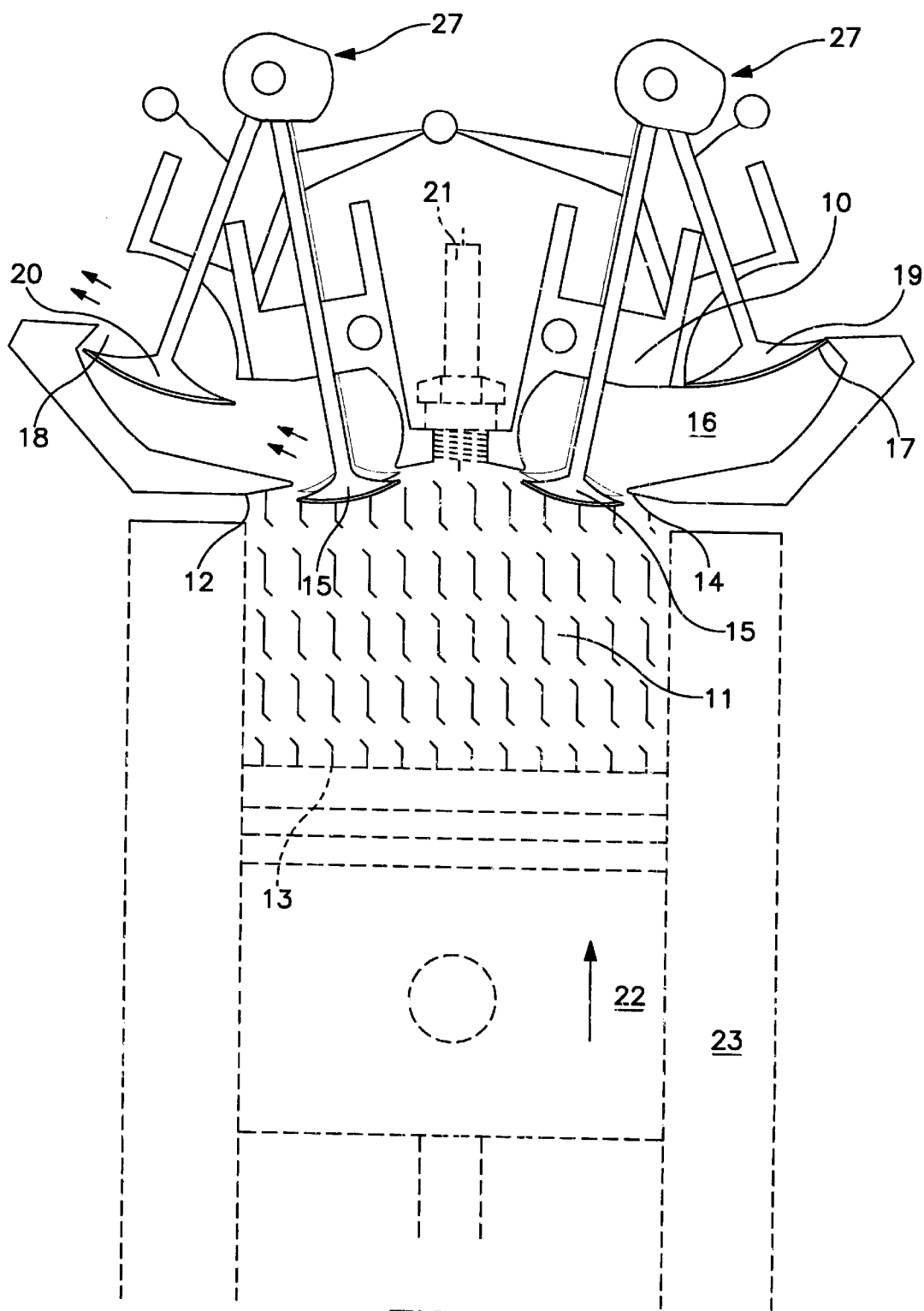
FIG. 9 is a schematic cross-sectional view of the invention with the working piston rising during the exhaust cycle.

In FIG. 6 the compression cycle is completed, the piston 22 is located at TDC, and working fluid ignition occurs to initiate the power cycle as illustrated in FIG. 7. At the end of the power cycle the piston 22 reaches BDC as illustrated in FIG. 8 and the combustion chamber compression valve or valves 15 and the pre-combustion chamber exhaust valve or valves 20 are opened allowing the combustion gases to be expelled from the cylinder. In the process of exhausting combustion gases illustrated in FIG. 9, a portion of said combustion gases will remain in the pre-combustion chamber to be mixed with the working fluid inducted in the subsequent intake cycle.

A further important feature of the invention lies in that the gas exchange ports 14 and the corresponding compression valves 15 associated with each cylinder combustion chamber may have specific shapes designed to optimize the mixing of fluid flows entering therein. In particular, the gas exchange ports 14 may be shaped so as to generate a high tumble of the fluid flow entering the combustion chamber. This can be obtained in any way known per se, by suitably designing the profile of said gas exchange ports.

Figure 10:
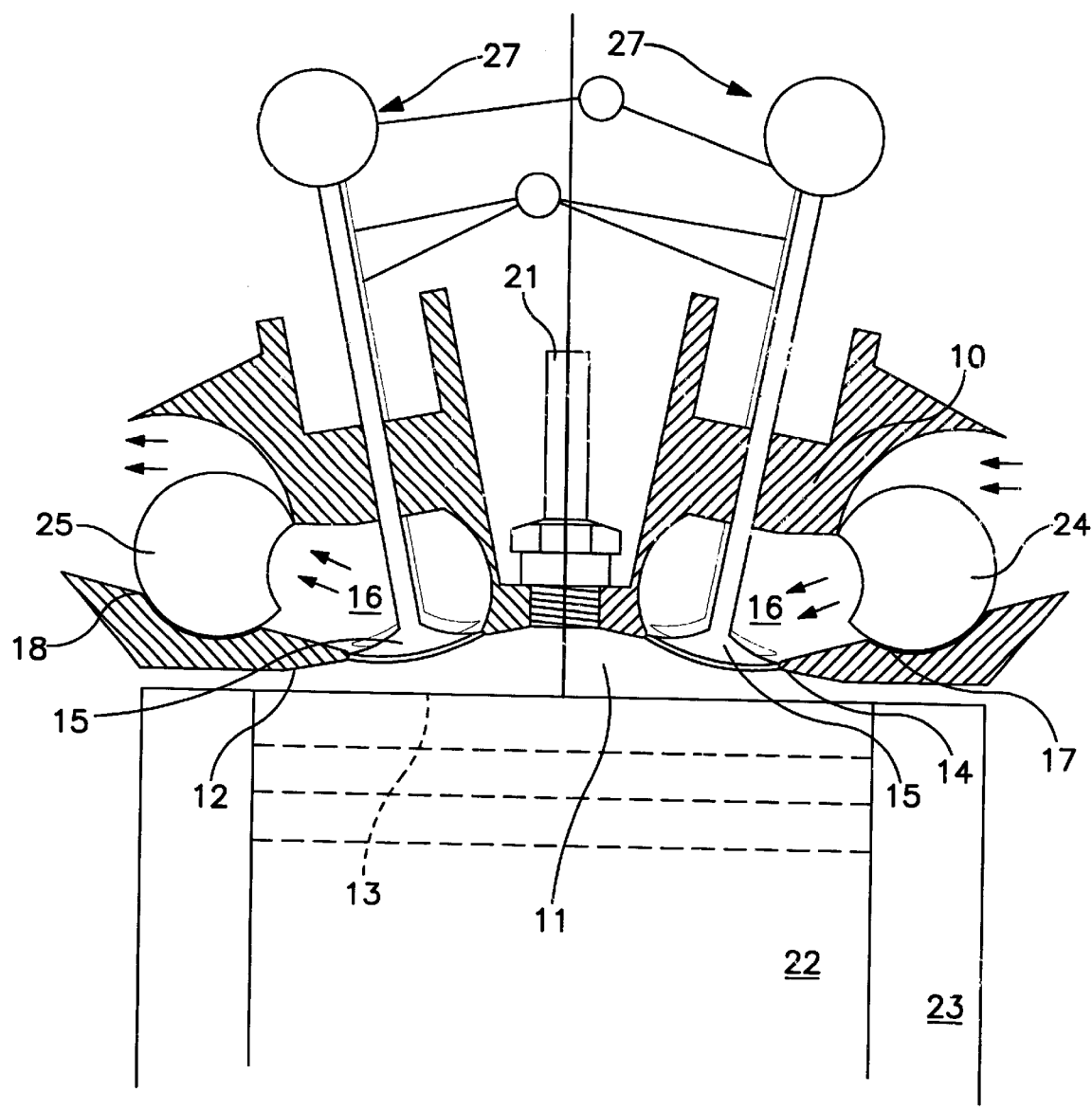
FIG. 10 is a schematic cross-sectional view of a second embodiment of the invention in which the conventional poppet-type valves communicating the intake and exhaust ducts with the pre-combustion chamber or plenum have been replaced with rotary valves.

FIG. 10 illustrates an alternative embodiment of the invention wherein the intake and exhaust valves are rotary valves 24, 25 respectively. This embodiment is in all other respects identical in structure and function to the embodiment of FIGS. 1–9.

Figure 11:
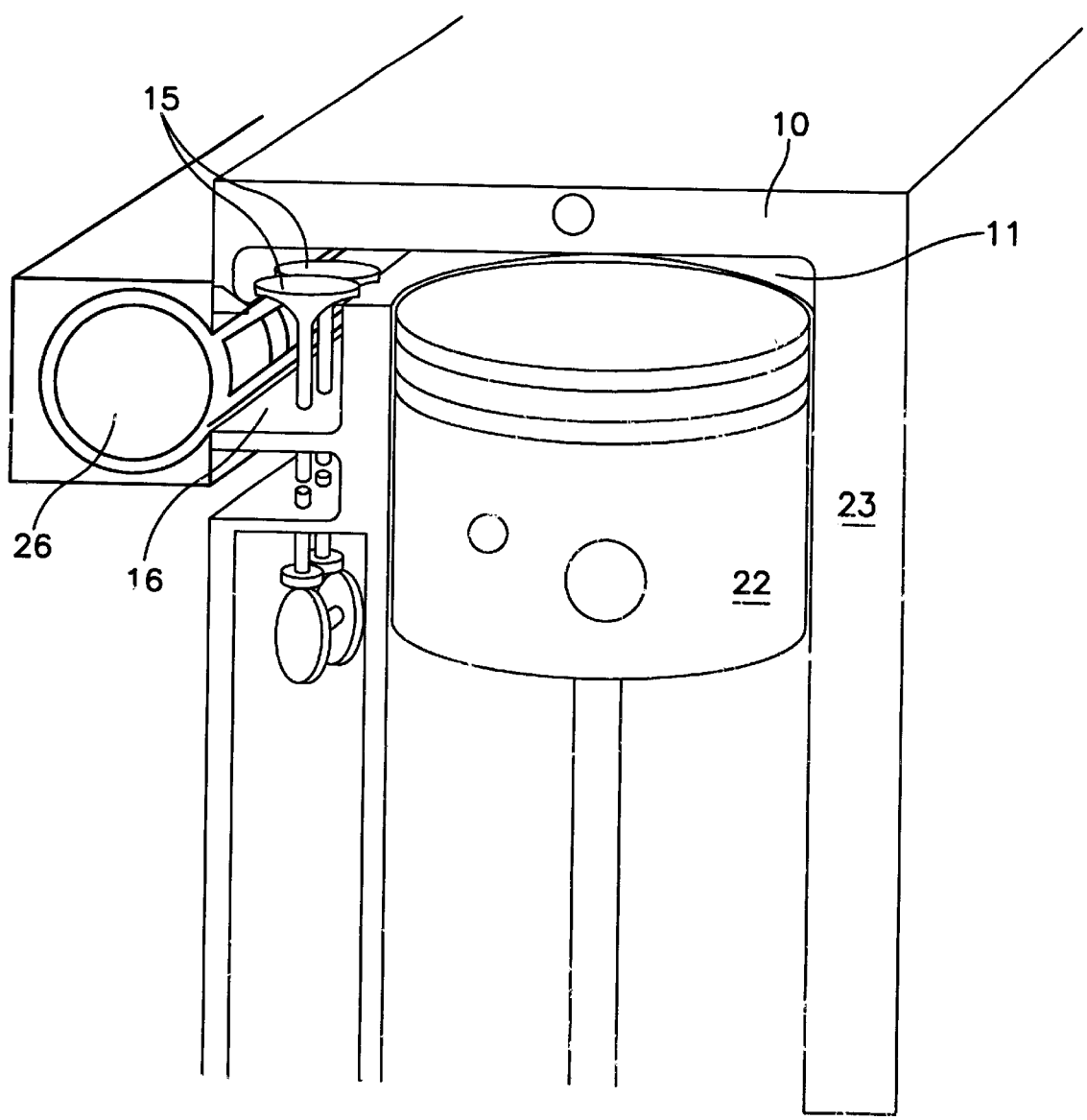
FIG. 11 is a schematic cross-sectional view of a third embodiment of the invention in which the engine type is of a lateral-valve configuration rather than the overhead valve type.

FIG. 11 illustrates another alternative embodiment of the invention wherein the engine has a lateral-valve configuration. Cylinder valves 15 are positioned between pre-combustion chamber 16 and combustion chamber 11 as in the embodiments of FIGS. 1–10. The exhaust and intake valves are illustrated at 26, and operate as in the other embodiments so as to advantageously allow the entire volume of pre-combustion chamber 16 to be used for both fuel intake and exhaust outflow.

Naturally, while the principle of the invention remains the same, the details of construction and the embodiments may widely vary with respect to what has been described and illustrated without departing from the scope of the present invention.

What is claimed is:

1. An apparatus for controlling gas exchange in a piston-type internal combustion engine having at least one cylinder defining a combustion chamber having a main fuel intake conduit and an exhaust conduit, comprising:

a pre-combustion chamber communicated between said main intake conduit, said exhaust conduit and said combustion chamber; and a valve arrangement including an intake valve between said main intake conduit and said pre-combustion chamber for controlling flow therebetween, an exhaust valve between said exhaust conduit and said pre-combustion chamber for controlling flow therebetween and a cylinder valve between said pre-combustion chamber and said combustion chamber for controlling flow therebetween, whereby said valve arrangement can be selectively operated to utilize said pre-combustion chamber for both fuel flow into said combustion chamber during an intake cycle and exhaust flow from said combustion chamber during an exhaust cycle.

2. An apparatus according to claim 1, further comprising a valve actuating member adapted for selectively operating said valve arrangement so as to open said intake valve and said cylinder valve and to close said exhaust valve during said intake cycle, and to close said intake valve arid open said exhaust valve and said cylinder valve during said exhaust cycle.

3. An apparatus according to claim 2, wherein said valve actuating member is further adapted to close at least said cylinder valve during compression and power cycles.

4. An apparatus according to claim 1, wherein said engine is selected from the group consisting of overhead valve-type engines, lateral valve-type engines and diesel engines.

5. An apparatus according to claim 1, wherein said intake valve and said exhaust valve are selected from the group consisting of poppet valves, rotary valves and combinations thereof.

6. An apparatus according to claim 1, wherein said cylinder valve is a compression valve.

7. An apparatus for controlling gas exchange in a piston-type internal combustion engine having at least one cylinder defining a combustion chamber having a main fuel intake conduit and an exhaust conduit, comprising:

a pre-combustion chamber communicated between said main intake conduit, said exhaust conduit and said combustion chamber;

a valve arrangement including an intake valve between said main intake conduit and said pre-combustion chamber, an exhaust valve between said exhaust conduit and said pre-combustion chamber and a cylinder valve between said pre-combustion chamber and said combustion chamber, whereby said valve arrangement can be selectively operated to utilize said pre-combustion chamber for both fuel flow into said combustion chamber during an intake cycle and exhaust flow from said combustion chamber during an exhaust cycle; and a valve actuating member adapted for selectively operating said valve arrangement so as to open said intake valve and said cylinder valve and to close said exhaust valve during said intake cycle, and to close said intake valve and open said exhaust valve and said cylinder valve during said exhaust cycle.

8. An apparatus for controlling gas exchange in a piston-type internal combustion engine having at least one cylinder defining a combustion chamber having a main fuel intake conduit and an exhaust conduit, comprising:

a pre-combustion chamber communicated between said main intake conduit, said exhaust conduit and said combustion chamber;

a valve arrangement including an intake valve between said main intake conduit and said pre-combustion chamber, an exhaust valve between said exhaust conduit and said pre-combustion chamber and a cylinder valve between said pre-combustion chamber and said combustion chamber, whereby said valve arrangement can be selectively operated to utilize said pre-combustion chamber for both fuel flow into said combustion chamber during an intake cycle and exhaust flow from said combustion chamber during an exhaust cycle, wherein said cylinder valve is operable between an open position wherein flow between said pre-combustion chamber and said combustion chamber is allowed, and a closed position wherein flow from said pre-combustion chamber to said combustion chamber is blocked.

9. An apparatus for controlling gas exchange in a piston-type internal combustion engine having at least one cylinder defining a combustion chamber having a main fuel intake conduit and an exhaust conduit, comprising:

a pre-combustion chamber communicated between said main intake conduit, said exhaust conduit and said combustion chamber;

a valve arrangement including an intake valve between said main intake conduit and said pre-combustion chamber, an exhaust valve between said exhaust conduit and said pre-combustion chamber and a cylinder valve between said pre-combustion chamber and said combustion chamber, whereby said valve arrangement can be selectively operated to utilize said pre-combustion chamber for both fuel flow into said combustion chamber during an intake cycle and exhaust flow from said combustion chamber during an exhaust cycle; and a valve actuating member adapted to close at least said cylinder valve during compression and power cycles whereby flow between said combustion chamber and said pre-combustion chamber is blocked by said cylinder valve when sail cylinder valve is in a closed position.

* * * * *